J. V. BEEKMAN.
Feed Water-Heaters.
No. 142,983.          Patented September 23, 1873.
_Fig. 1._
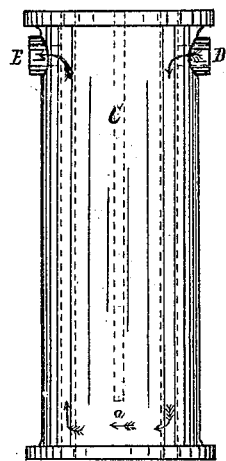
_Fig. 2._
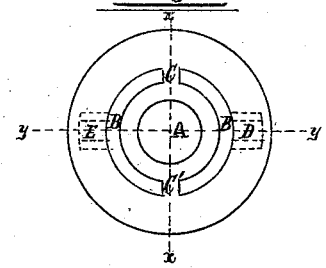
_Fig. 3._
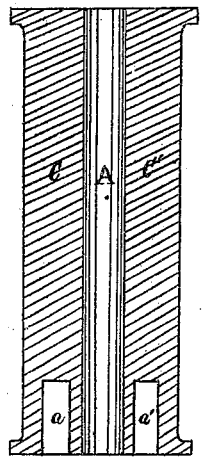
_Fig. 4._
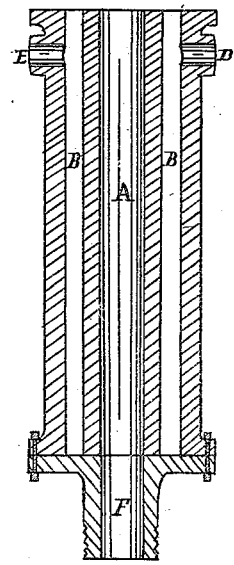
Witnesses:
Inventor:
John V. Beekman
By ........... his atty

UNITED STATES PATENT OFFICE.

JOHN V. BEEKMAN, OF BROOKLYN, NEW YORK, ASSIGNOR TO HIMSELF AND JOHN A. LIGHTHALL, OF SAME PLACE.

IMPROVEMENT IN FEED-WATER HEATERS.

Specification forming part of Letters Patent No. 142,983, dated September 23, 1873; application filed March 19, 1873.

*To all whom it may concern:*

Be it known that I, JOHN V. BEEKMAN, of Brooklyn, county of Kings, State of New York, have invented a Water-Heating Attachment for Steam-Boilers, of which the following is a specification, reference being had to the accompanying drawings, forming part of the same.

My invention consists of a chamber arranged about the exterior surface of the exhaust-pipe of an engine, through which chamber the water supplied to the boiler circulates, and is raised in temperature by contact with the exterior surface of the exhaust-pipe, which is heated by the exhaust steam, without causing any obstruction to the same, that passes through it.

Figure 1 is a side elevation of my invention. Fig. 2 is an end view of the same. Fig. 3 is a longitudinal central sectional view of the same on the line $x\,x$, Fig. 2. Fig. 4 is a similar view of the same on the line $y\,y$, Fig. 2.

A is the pipe through which the exhaust steam passes in its discharge from the cylinder of the engine. B is the heating-chamber surrounding the exhaust-steam pipe, through which circulates the water supplied to the boiler. C C' are flanges or walls running longitudinally nearly the entire length of the chamber B, and dividing it into two compartments, communicating with each other through the openings $a\,a'$, Fig. 3. D is the opening through which the water enters the heating-chamber B, and E is the opening through which the heated water passes into the pipe conveying it to the boiler. In Fig. 4, F is a head, bolted upon one end of my apparatus, and closing the ends of the heating-chamber B, with an opening through it corresponding to the pipe A, and having a coupling with a thread turned upon it at its end to allow of its being screwed firmly to the exhaust-pipe of the engine. A similar coupling-head is bolted upon the other end of the heater, and secured in like manner to the continuation of the exhaust-pipe; the pipe or chamber A in my heater thus forming in reality a part of the exhaust-pipe of the engine.

In fabricating my invention, I cast in a suitable mold, in one piece, the apparatus shown, composed of the inner pipe or chamber A, the heating-chamber B, with the longitudinal flanges or walls C C', connecting the body of the steam-pipe A with the body of the chamber B, and running nearly the entire length of the chamber B, dividing it into two compartments, which communicate with each other through the openings $a\,a'$, and having the openings D leading into, and the opening E leading out of, the chamber B. Upon either end of the apparatus I then bolt a head, F, using some suitable packing to prevent the leaking of water at the ends of the chamber B into the exhaust-pipe A. Upon these heads is a coupling, upon which is turned a thread to enable them to be screwed firmly into the exhaust-pipe of the engine, so that the pipe A forms in reality a part or section of the exhaust-pipe through which the steam from the cylinder is continuously and directly discharged.

The operation of my heater is as follows: The water to be supplied to the boiler passes at a normal temperature into the chamber B, through the opening D, and circulates down through that compartment of the chamber B which is nearest the pipe D, and passes through the openings $a\,a'$, into and up through the other compartment of the chamber B, being, in its course, in contact with and heated by the exterior surface of the pipe A, which is maintained at a high temperature by the exhaust steam that is discharged through it. The water thus heated passes out of the chamber B, through the opening E, into a pipe, which conveys it to the boiler.

What I claim as my invention, and desire to secure by Letters Patent, is—

The combination of the heating-chamber B with the division flanges or walls C C' within said chamber, constructed and operating as and for the purpose specified.

JOHN V. BEEKMAN.

Witnesses:
A. LIVINGSTON MILLS,
H. S. SMITH.